3,574,740
METHOD OF PREPARING METHANE SULFONAMIDE AND ITS DERIVATIVES
Le Roy Martin, Riverview, Mich., assignor to
Pennwalt Corporation
No Drawing. Filed June 11, 1968, Ser. No. 735,989
Int. Cl. C07c *143/74*
U.S. Cl. 260—556                                      7 Claims

ABSTRACT OF THE DISCLOSURE

Methane sulfonamide and its derivatives are prepared by reacting methane sulfonyl chloride with an amine, e.g., ammonia or a primary or secondary alkyl amine, in a nitroalkane as a reaction diluent, whereby the amine hydrochloride salt by-product precipitates and is easily separated from the sulfonamide product-nitroalkane solution at a moderately elevated temperature, such as by filtration or centrifugation. The sulfonamide product is separated from the nitroalkane by such means as crystallization, distillation, or extraction techniques.

---

This invention relates to a method of preparing methane sulfonamide or its derivatives. More particularly, this invention concerns the process wherein methane sulfonamide or a derivative thereof is prepared by reacting methane sulfonyl chloride with ammonia or a primary amine or a secondary amine, the improvement in the process comprising carrying out said reaction in an inert diluent comprising a nitroalkane.

Methane sulfonamide and its derivatives are prepared as described herein by contacting methane sulfonyl chloride with ammonia or a primary or a secondary amine, according to the reaction:

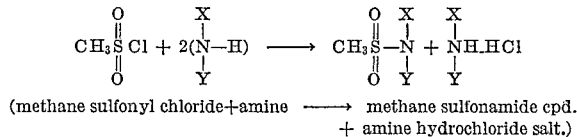

(methane sulfonyl chloride+amine  ⟶  methane sulfonamide cpd.
                                                                           + amine hydrochloride salt.)

In the above formulae, X and Y are independently hydrogen and alkyl radicals having up to twelve carbon atoms. Typical primary and secondary amines represented by

are methyl amine, dimethy amine, ethyl amine, diethyl amine, propyl amine, dipropyl amine, isopropyl amine, diisopropyl amine, butyl amine, dibutyl amine, 2-ethylhexyl amine, di(2-ethylhexyl)amine and the like. When X and Y in the above formula are both hydrogen whereby the "amine" reactant is ammonia and the amine hydrochloride salt by-product is then ammonium chloride, the reaction is depicted as:

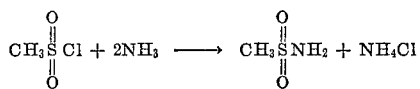

The foregoing reactions to prepare methane sulfonamide and its derivatives have previously been carried out in various solvents and reaction diluents which have not proven to be satisfactory for one or more reasons including lack of chemical inertness and the proper solubility characteristics. For example, the reaction conducted in water gives an undesirably high yield of ammonium methane sulfonate and like products. The use of alkylene chlorides, aliphatic hydrocarbons or aromatic hydrocarbons as reaction diluents is disadvantageous because the amide products as well as the amine hydrochloride by-products are insoluble in such media precluding their separation by filtration or centrifugation. Alcohols are not suitable reaction media because they are not sufficiently inert and cause the formation of dialkylethers and esters of methane sulfonic acid as by-products. Moreover, the amine hydrochloride salt by-products are quite soluble in alcohols eliminating the possibility of their easy separation.

It has now been discovered in accordance with this invention that in the method of preparing methane sulfonamide or a derivative thereof via the reaction of methane sulfonyl chloride with ammonia, a primary amine or secondary amine, improved results are obtained by using a nitroalkane as the reaction diluent, thereby facilitating the ready separation of the sulfonamide product from the amine hydrochloride salt by-product. The separation is simple because the sulfonamide product is substantially soluble in the nitroalkane at moderately elevated temperatures, for instance, in the range of about 50 to about 80° C. and higher; however, it is relatively insoluble at ambient and lower temperatures, e.g., in the range of about 0 to 25° C. On the other hand, the salt by-product of the reaction is essentially insoluble in the nitroalkane in the entire range of temperatures encountered in the practical operation of the process. In addition, the sulfonamide product is of high purity and is produced in good yield. In this connection, moreover, the nitroalkane diluent is inert to the reactants and thus the formation of by-product impurities in the reaction mixture is negligible. Consequently, the nitroalkane diluent, generally containing some dissolved sulfonamide product, can be recycled without further treatment to the synthesis step thereby eliminating purification steps and also increasing the sulfonamide yield.

The reaction diluent and solvent employed in the process of this invention is a readily available and inexpensive nitroalkane having from one to four carbon atoms, for example, nitromethane, nitroethane, 1 - nitropropane, 2-nitropropane and nitrobutane. As previously stated, the value of these solvents as diluents in the process of the present invention derives from (1) the insolubility therein of the amine hydrochloride salt at all practical temperatures encountered and (2) the relative insolubility of the sulfonamide product therein at lower temperatures compared to the substantial solubility therein of the sulfonamide at elevated temperatures. This phenomenon is illustrated by the following representative solubility data of materials embodied in the process in representative nitroalkane solvents. More particularly, the exemplary sulfonamide product is methane sulfonamide (MSAm) and the amine hydrochloride salt is ammonium chloride ($NH_4Cl$).

SOLUBILITY IN REACTION DILUENT, WEIGHT PERCENT

| | Solvent | | | |
|---|---|---|---|---|
| Solute | Nitromethane | Nitroethane | 2-nitropropane | 1-nitropropane |
| At 25° C.: | | | | |
| MSAm | 17.0 | 5.0 | 1.7 | Ca. 1. |
| $NH_4Cl$ | Insoluble | Insoluble | Insoluble | Insoluble. |
| At 50° C.: | | | | |
| MSAm | 47.3 | 15.0 | Ca. 10 | 4.7. |
| $NH_4Cl$ | Insoluble | Iusoluble | Insoluble | Trace. |
| At 75° C.: | | | | |
| MSAm | 80.5 | 75.0 | 12.5 | 6.8. |
| $NH_4Cl$ | Insoluble | Insoluble | Insoluble | Trace. |

In carrying out this invention, methane sulfonyl chloride is contacted with gaseous ammonia or a primary or secondary amine in the nitroalkane diluent. It is advantageous that the reaction be carried out in the absence of water to avoid undesirable side reactions. Therefore, the nitroalkane should be substantially anhydrous, e.g., containing less than about 2.0% of water. The amine, methane sulfonyl chloride and nitroalkane are usually miscible in most proportions. The weight ratio of nitroalkane diluent to the methane sulfonyl chloride is generally in the range of about 2:1 to about 20:1, preferably 3:1 to 4:1. The reaction temperature may range from about 10 to about 90° C., but usually is maintained at about 50 to 70° C. In general, a slight excess of amine is employed. As the reaction progresses, the amine hydrochloride by-product will appear as precipitated salt. A portion of the sulfonamide product may precipitate, the amount of this product that comes out of solution depending on the reaction temperature.

Subsequent to the completion of the reaction, which generally requires from about 20 to 180 minutes, the next steps are the separation and recovery of the products and diluent. The recovery procedure is initiated by raising the temperature of the reaction mixture, if so required, to solubilize any precipitated sulfonamide product, e.g., on the order of about 50 to 80° C. If, of course, the reaction has been carried out at these higher temperatures the solubilization is already complete. The reaction mixture, now a slurry of amine hydrochloride salt crystals in nitroalkane-sulfonamide product mother liquor, is subjected to a conventional liquid-solids separation operation such as filtration or centrifugation. The by-product salt is recovered as wet cake which is conveniently washed with fresh heated nitroalkane solvent. The residual nitroalkane in the salt cake can be recovered in an evaporative drier equipped with solvent recovery means or, in the alternative, by dissolving the wet salt cake in water and separating the water-immiscible nitroalkane by decantation.

The sulfonamide product is recovered from the filtrate (nitroalkane solution) by one of three procedures. In the preferred embodiment, the solution is cooled to precipitate the sulfonamide product therefrom as easily recoverable crystals using filtration or centrifugation techniques. The temperatures used to precipitate the sulfonamide are on the order of about 0 to about 25° C. The nitroalkane filtrate will still contain some dissolved sulfonamide, the amount depending on the crystallization temperature and its particular solubility properties; however, the nitroalkane is recycled to the synthesis step without any further purification or processing, thus ensuring the eventual recovery of the dissolved sulfonamide and a good product yield.

In a less preferred embodiment for recovering the sulfonamide from nitroalkane solution, the filtrate is treated with water as an extractive solvent for the sulfonmide. Approximately 0.2 to 0.3 part by weight of water are used per part by weight of the sulfonamide-nitroalkane solution. The aqueous extract layer and nitroalkane solvent layer are separated by decantation. The disadvantage of this technique is that the nitroalkane must be dried to a substantially anhydrous condition before recycling to the synthesis step, such as by passage through a desiccant, such as calcium chloride or calcium sulfate crystals or by removal of the residual water by azeotropic distillation. The sulfonamide product may be offered and used commercially as an aqueous solution, or recovered from the aqueous layer by removal of the bulk of the water by distillation followed by cooling to precipitate the sulfonamide and finally filtration of the slurry.

Another less preferred method of recovering the sulfonamide from the nitroalkane solution is a distillative separation at atmospheric or reduced pressures. The nitroalkane is stripped from the solution and recycled without further processing. If desired, the sulfonamide may be further purified by low pressure distillation, e.g., at from 1 to about 150 mm. Hg abs.

The following illustrative examples are set forth to clarify the invention and should not be interpreted as limitative of the scope thereof as defined by the claims.

EXAMPLE 1

To 1900 parts by weight of nitroethane are added and dissolved 573 parts by weight of methane sulfonyl chloride. Gaseous ammonia is passed through the mixture at a reaction temperature of 40 to 50° C. until the mixture is slightly basic; during this reaction, the precipitation of the by-product ammonium chloride is observed. The mixture is heated to 70° C. and filtered. The ammonium chloride filter cake is washed with two 100 part portions of nitroethane at 70° C. and the washings are combined with the filtrate.

The filtrate is cooled to about 8° C. to precipitate the methane sulfonamide proudct which is recovered by filtration as a white, crystalline material in a yield of 77% of theoretical; it is dried at 70° C. and 50–150 mm. Hg. The nitroethane filtrate (including 100 parts used to wash the product filter cake) which contains some dissolved methane sulfonamide is recycled and used in a series of additional prepartions substantially as described above. The recovery of methane sulfonamide from a seven-run series with recycling of the nitroethane raises the yield to 94% based on theoretical recovery.

EXAMPLE 2

Gaseous ammonia is passed through a mixture of 50 parts of methane sulfonyl chloride and 400 parts of 2-nitropropane maintained at 15–30° C. until the reaction mixture is slightly basic. The mixture is then heated to 65° C. and filtered to separate the precipitated ammonium chloride, which filter cake is washed with 100 parts of heated nitropropane. Water (100 parts) is mixed with the filtrate and the mixture is allowed to separate into an organic layer and a lower aqueous phase. This aqueous extract layer contains 84% of the theoretical yield of methane sulfonamide. The ammonium chloride filter cake contains 3.1% of the theoretical yield. The nitropropane filtrate accounts for the remainder as dissolved methane sulfonamide. The filtrate is recycled for solvent use in additional preparations without further treatment except for passage through silica gel or calcium chloride crystals to remove residual moisture.

EXAMPLE 3

Methane sulfonyl chloride (916 parts, 8 moles) is added over a period of about 90 minutes to anhydrous dimethyl amine (722 parts, 16 moles) in solution in 2000 parts nitroethane. The reaction temperature is 25 to 30° C. The mixture is then heated to 50° C. and filtered to separate the amine hydrochloride salt by-product as the filter cake; the cake is washed with fresh, heated nitroethane. The nitroethane (B.P. 114° C. at 760 mm. Hg) is stripped from the filtrate by distillation and the dimethyl methane sulfonamide product (M.P. 48.5° C.) is recovered by reduced pressure distillation at 108° C. and 10 mm. Hg. The yield of the sulfonamide product is 94.3% of theoretical.

EXAMPLE 4

Anhydrous monomethylamine (186 parts, 6 moles) is added to methane sulfonyl chloride (344 parts, 3 moles) in solution in 1000 parts 1-nitropropane. The addition time is 1.5–2.0 hours, maintaining a reaction temperature of 15–25° C. The mixture is warmed to about 50° C., filtered to separate the amine hydrochloride salt, the filter cake is washed with fresh, warm 1-nitropropane and the wash combined with the filtrate. The N-methyl methane sulfonamide product is extracted from the 1-nitropropane with 400 parts of water. Residual 1-nitropropane is removed from the aqueous N-methyl methane solution by heating to about 75° C. under vacuum, and further concentrated by removal of water to a 50% solution. The yield of product is 96% by chemical analysis.

I claim:
1. The method of preparing methane sulfonamide and its derivatives which comprises reacting methane sulfonyl chloride with an amine of the formula

where X and Y are independently selected from the group consisting of hydrogen and alkyl radicals having up to twelve carbon atoms in a reaction diluent consisting essentially of a substantially anhydrous nitroalkane having one to four carbon atoms, separating by filtering or centrifugating the precipitated amine hydrochloride salt by-product from the sulfonamide product-nitroalkane mixture at an elevated temperature on the order of about 50° C. to 80° C. sufficient to render the sulfonamide soluble in the nitroalkane, and separating the sulfonamide product from the nitroalkane.

2. The method of claim 1 wherein the nitroalkane is nitromethane.

3. The method of claim 1 wherein the nitroalkane is nitroethane.

4. The method of claim 1 wherein the nitroalkane is nitropropane.

5. The method of claim 1 wherein the amine is ammonia.

6. The method of claim 1 wherein the amine is monomethyl amine.

7. The method of claim 1 wherein the amine is dimethyl amine.

References Cited
UNITED STATES PATENTS

| | | | |
|---|---|---|---|
| 2,197,851 | 4/1940 | Dietrich | 260—556A |
| 3,430,259 | 2/1969 | Newbold et al. | 260—556A |

OTHER REFERENCES

The Systematic Identification of Organic Compounds, Shriner et al., 3rd ed., 1948, John Wiley & Sons, Inc., pp. 216, 217, 275.

Advances in Organic Chemistry, vol. 5, 1965, Interscience Publishers, ed. Raphael et al., pp. 1–3, "The Use of Dipolar Aprotic Solvents in Organic Chemistry" by Parker.

HENRY R. JILES, Primary Examiner

S. D. WINTERS, Assistant Examiner